(12) United States Patent
Kuchibhotla et al.

(10) Patent No.: US 8,892,712 B2
(45) Date of Patent: Nov. 18, 2014

(54) UPGRADING ENTERPRISE MANAGERS

(71) Applicant: Oracle International Coporation, Redwood Shores, CA (US)

(72) Inventors: Balasubrahmanyam Kuchibhotla, San Ramon, CA (US); Karl Dias, Foster City, CA (US); Matthew Stephen McKerley, Berkley, CA (US); Shachi Sanklecha, Banglore (IN); Anupama Vale, Bangalore (IN); Sumankumar Pramanik, Bangalore (IN); Sanjay Ediga, Bangalore (IN); Jonathan D. Klein, Redwood City, CA (US); Supratim Choudhury, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 13/630,869

(22) Filed: Sep. 28, 2012

(65) Prior Publication Data
US 2013/0117441 A1 May 9, 2013

Related U.S. Application Data

(60) Provisional application No. 61/541,993, filed on Sep. 30, 2011.

(51) Int. Cl.
*G06F 15/173* (2006.01)
*H04L 12/24* (2006.01)
*H04L 12/26* (2006.01)
(52) U.S. Cl.
CPC .............. *H04L 43/12* (2013.01); *H04L 41/046* (2013.01); *H04L 41/00* (2013.01)
USPC ............................ 709/223; 709/217; 709/229

(58) Field of Classification Search
USPC .................. 709/223, 224, 203, 217, 219, 229
See application file for complete search history.

(56) References Cited

U.S. PATENT DOCUMENTS

| | | | | |
|---|---|---|---|---|
| 5,655,081 | A | * | 8/1997 | Bonnell et al. ................. 709/202 |
| 7,454,487 | B1 | * | 11/2008 | Becher et al. .................. 709/223 |
| 7,487,106 | B2 | * | 2/2009 | Levine et al. ................. 705/7.14 |
| 7,539,706 | B1 | * | 5/2009 | Campbell ............................. 1/1 |
| 7,984,074 | B1 | * | 7/2011 | Becher et al. ................. 707/802 |
| 8,190,715 | B1 | * | 5/2012 | Narayanaswamy et al. .. 709/220 |
| 8,443,438 | B1 | * | 5/2013 | Sharir et al. ..................... 726/22 |
| 8,463,885 | B2 | * | 6/2013 | DeHaan .......................... 709/221 |
| 8,484,711 | B1 | * | 7/2013 | Coletta et al. ..................... 726/7 |

(Continued)

*Primary Examiner* — Lashonda Jacobs
(74) *Attorney, Agent, or Firm* — Hickman Palermo Truong Becker et al LLP; Michael C. Brandt

(57) ABSTRACT

Techniques are described for upgrading systems that include a first set of agents for collecting target data from a plurality of targets and sending the target data to a first management server. In an embodiment, a second set of agents is pre-deployed. Each pre-deployed agent is configured to, upon activation, collect target data from a respective target of the plurality of targets and send the target data to a second management server. While the pre-deployed agent remains inactive, an agent from the first set of agents collects and sends the target data to the first management server. When a first batch of one or more pre-deployed agents is activated, each activated agent begins collecting target data and sending the target data to the second management server. For agents not in the first batch, the first set of agents continues to collect and send the target data.

20 Claims, 8 Drawing Sheets

(56) References Cited

U.S. PATENT DOCUMENTS

| | | | |
|---|---|---|---|
| 2003/0212716 A1* | 11/2003 | Steele et al. | 707/203 |
| 2003/0212775 A1* | 11/2003 | Steele et al. | 709/223 |
| 2005/0097201 A1* | 5/2005 | Benhamou | 709/223 |
| 2005/0114504 A1* | 5/2005 | Marolia et al. | 709/224 |
| 2006/0136701 A1* | 6/2006 | Dickinson | 712/205 |
| 2007/0087756 A1* | 4/2007 | Hoffberg | 455/450 |
| 2009/0019206 A1* | 1/2009 | Engel et al. | 710/305 |
| 2010/0228849 A1* | 9/2010 | Moore et al. | 709/224 |
| 2010/0281456 A1* | 11/2010 | Eizenman et al. | 717/104 |
| 2010/0332713 A1* | 12/2010 | Engel et al. | 710/305 |
| 2011/0228940 A1* | 9/2011 | Shah et al. | 380/259 |
| 2011/0231918 A1* | 9/2011 | Shah et al. | 726/8 |
| 2013/0016729 A1* | 1/2013 | Engel et al. | 370/401 |
| 2013/0132461 A1* | 5/2013 | Patel | 709/202 |
| 2013/0246502 A1* | 9/2013 | Thorvaldsen et al. | 709/202 |
| 2014/0012834 A1* | 1/2014 | Kisin et al. | 707/711 |
| 2014/0089490 A1* | 3/2014 | Kunisetty et al. | 709/224 |

* cited by examiner

UPGRADING ENTERPRISE MANAGERS

CROSS-REFERENCE TO RELATED APPLICATIONS; BENEFIT CLAIM

This application claims the benefit of Provisional Appln. 61/541,993 filed Sep. 30, 2011, the entire contents of which is hereby incorporated by reference as if fully set forth herein, under 35 U.S.C. §119(e).

FIELD OF THE INVENTION

The present invention relates, generally, to management systems and, more specifically, to upgrading systems that include a plurality of agents for collecting data from different targets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An enterprise manager is a computer application or set of applications that manages targeted software and/or hardware in an enterprise system. In a typical implementation, the enterprise manager comprises collection agents, a management server, and a repository. Each agent monitors and collects data from a target host. The management server receives the collected data from the agents and aggregates the collected data into the repository. The management server may also comprise a user interface that allows a system administrator to configure the settings of the enterprise manager and view the status of the target software and hardware systems.

Upgrading an enterprise manager can be a time-consuming and resource-intensive activity given the typical scale and complexity of the system on which the enterprise manager is deployed. For example, there may be thousands of collection agents distributed across different network nodes in a variety of regions and offices. In order to install a product update, each of these agents may need to be replaced with a new agent that is compatible with the new features. This complexity can become particularly burdensome on the system administrator responsible for managing the upgrade process. The system administrator must ensure that all agents are updated and functioning correctly. In addition, the system administrator may need to schedule a significant chunk of time to perform the system upgrade.

One straightforward approach to performing an upgrade involves completely shutting down the currently executing enterprise manager before the new enterprise manager is deployed. During this shutdown period, the collection agents stop monitoring their targets and sending data to the management server until the new enterprise manager is installed and activated. In large-scale systems, this approach results in significant downtime, especially where the collection agents need to be replaced with new agents. Because the collection agents are temporarily inactive, the enterprise manager may suffer from substantial monitoring loss.

In another approach, the new enterprise system maintains backward compatibility with the pre-update agents. This approach may reduce downtime and monitoring loss incurred from installing the new management system. However, maintaining backward compatibility often involves significant development costs, especially when the next generation system involves complex changes or other significantly differences from the legacy system. In addition, this approach constrains the development process of the next generation system, which leads to sub-optimal design that can permanent affect the next generation's product release.

BRIEF DESCRIPTION OF THE DRAWINGS

A more complete appreciation of the embodiments and many of the attendant advantages thereof will be readily obtained as the same becomes better understood by reference to the following detailed description when considered in connection with the accompanying drawings, wherein.

DETAILED DESCRIPTION

Figure 1:
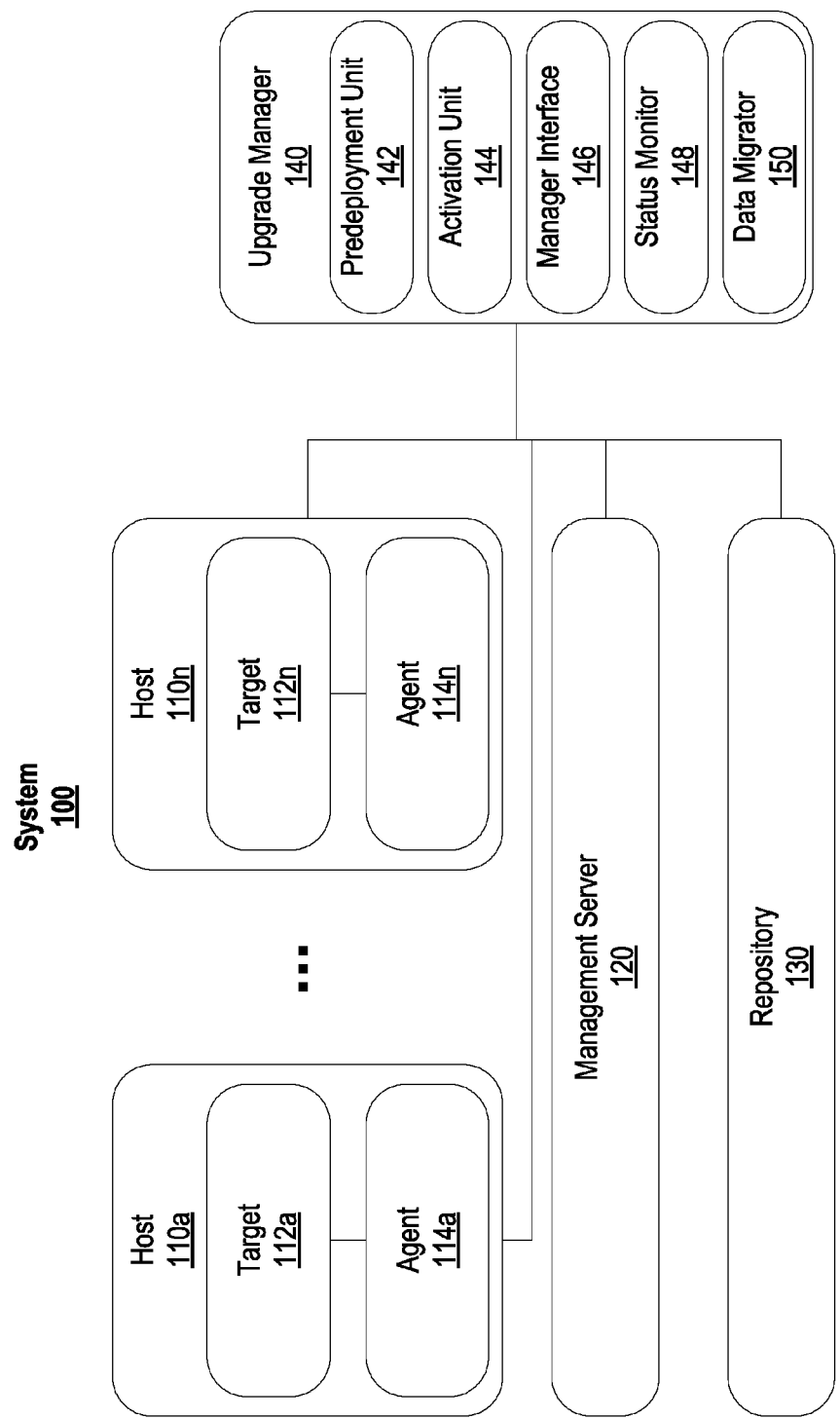
FIG. 1 is a block diagram illustrating a system architecture on which an embodiment may be implemented.

Techniques are described herein for upgrading enterprise management systems. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, management systems can be upgraded with zero or near-zero downtime even though the newly deployed system may not be backward compatible with the old system and the upgrade process may span a significant period of time. In an embodiment, a management system that is targeted for upgrade includes a set of collection agents for monitoring targets and sending collected target data to a management server. To upgrade the management system, a second set of agents is pre-deployed. Each pre-deployed agent is configured to, upon activation, collect target data from a corresponding target and send the target data to a second management server. While the pre-deployed agent remains inactive, an agent from the first set of agents collects and sends the target data to the first management server. When a first batch of one or more pre-deployed agents is activated, each activated agent begins collecting target data and sending the target data to the second management server. For agents not in the first batch, the first set of agents continues to collect and send the target data. This process may continue until all the agents have been upgraded. Once all the agents are upgraded, the old management system may be decommissioned.

In an embodiment, the second management server is configured and activated before any of the second set of agents is activated. During this process, a first repository that stores data for the first management server is backed up. The backup repository is configured and used to store data collected by the second set of agents.

In another embodiment, the first set of agents may be used as a fallback in case of failure of one of the second set of agents. If one of the activated agents in the second set is not operating properly, then the upgrade process may deactivate the agent and fall back to the pre-upgrade agent.

The upgrade process may be augmented by other, additional features, depending on the particular implementation. In one example embodiment, the upgrade process may perform health and other status checks of various components involved in the upgrade process. In another example, the upgrade process may defer copying a portion of the first repository to the second repository to help speed up the upgrade process. In yet another example, the upgrade process may identify groups of related agents to ensure that related agents are upgraded together in the same batch.

System Architecture

FIG. 1 is a block diagram illustrating a system architecture on which an embodiment may be implemented. System 100 generally comprises host 110a to 110n, management server 120, repository 130, and upgrade manager 140.

Hosts 110a to 110n are a set of n network hosts, where n is a positive integer, and generally comprise targets 112a to 112n and agents 114a to 114n. Each agent is a software program, such as a service or daemon, that is part of a management system such as a network management system (NMS) or other enterprise manager. Each agent executes on the corresponding host machine and monitors the corresponding target. The target may be the host machine itself or a particular application that executes on the host machine. Although only one agent is illustrated per host, the number of agents per host may vary from implementation to implementation. For example, multiple agents may be installed on a given host to monitor different target applications or hardware.

Agents 114a to 114n are communicatively coupled with management server 120 and send the collected data to management server 120 according to one or more communication protocols. Example communication protocols that may be used to transport data between the agents and management server 120 include, without limitation, the hypertext transfer protocol (HTTP), simple network management protocol (SNMP), and other communication protocols of the internet protocol suite. The agents send the data to management server 120 through one or more ports on their respective host machines.

Management server 120 aggregates data collected by agents 114a to 114n and stores the aggregated data in repository 130. In an embodiment, management server 120 is executed by one of hosts 110a to 110n. Alternatively, management server 120 is executed on a different host machine that does not execute any agents. Similarly repository 130 may reside on any of the illustrated host machines or may be implemented on a separate host. The data that are collected and stored may vary from implementation to implementation. For example, in the case where the target is the host, the target data may include, without limitation, information on the hardware, operating system, and applications that run on the host.

Upgrade manager 140 manages the upgrade process while a legacy management system is replaced with a new management system. The new management system is herein referred to as a next generation ("NG") system. Typically, the NG system is a newer version of the legacy system that includes upgraded features that were not present in the legacy system. However, in other embodiments, the NG system may be an older version of the management system or may be a completely different management system altogether. Upgrade manager 140 generally comprises pre-deployment unit 142, activation unit 144, manager interface 146, status monitor 148, and data migrator 150. Each of these modules aids in the process of upgrading from the legacy system to the NG system, as described in further detail below.

Pre-Deployment of New System Components

Figure 2:
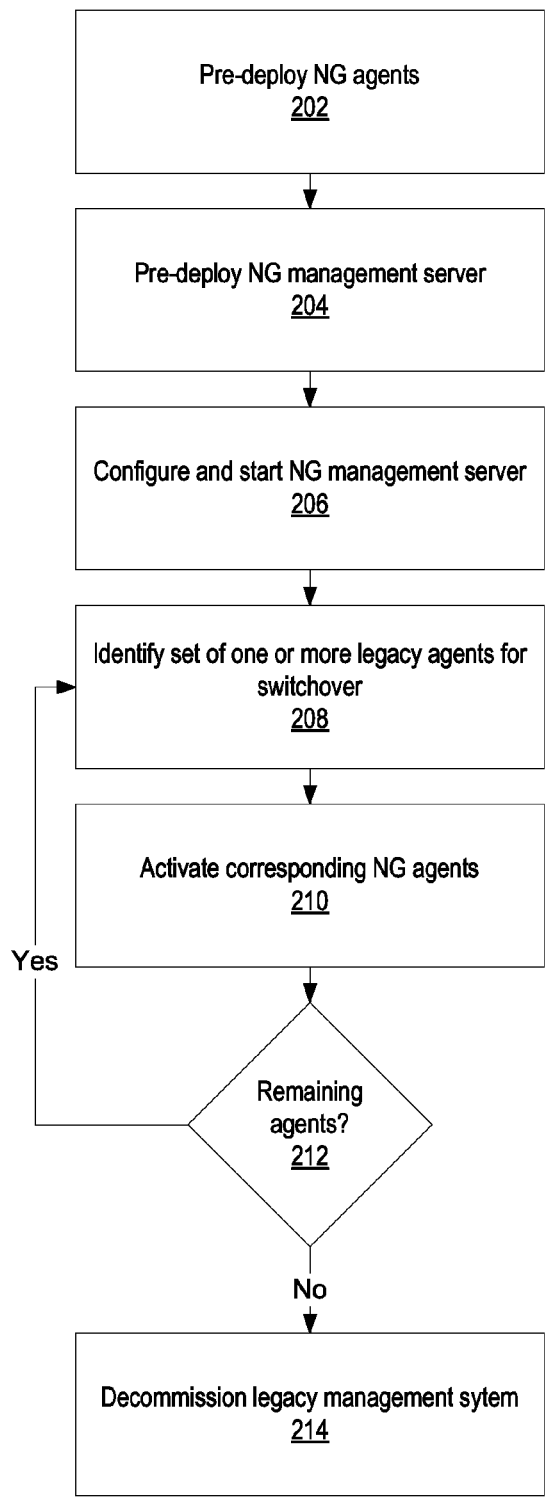
FIG. 2 is a flowchart illustrating a process for upgrading a management system using pre-deployment techniques, according to an embodiment.

In an embodiment, the legacy system components are upgraded to NG components using pre-deployment techniques. FIG. 2 is a flowchart illustrating a process for upgrading a management system using pre-deployment techniques, according to an embodiment.

In step 202, a set of one or more NG agents is pre-deployed. In this step, pre-deployment unit 142 places the software for the NG agents on the corresponding hosts that will execute the NG agents. However, the NG agents are not activated at this time. Rather, the pre-deployed NG agents reside on the hosts without monitoring or collecting data from their targets. During the pre-deployment phase, the corresponding legacy agent remains active, collecting data from the target and sending the data to the legacy management server. Although this step is illustrated as the first step in the upgrade process, the NG agents may be pre-deployed at any point in the upgrade process before they are activated. In addition, different sets of NG agents may be pre-deployed at different times during the upgrade process. For example, a first batch of NG agents may be pre-deployed before the NG management server becomes active. A second batch of NG agents may then be deployed after the NG manager server becomes active or even after one or more of the first batch of NG agents becomes active. Thus, agents can be pre-deployed and upgraded out of place.

In step 204, the NG management server is pre-deployed. In this step, pre-deployment unit 142 places the software for the NG management server on a selected host. In an embodiment, the selected host is the same machine that is executing the legacy management server. Alternatively, the selected host is a different machine than the host executing the legacy management server. The NG management server is not active when in the pre-deployed state. The pre-deployed NG management server simply resides on the host without communicating with the NG agents, aggregating collected data, or performing any of its normal operational functions.

Figure 3A:
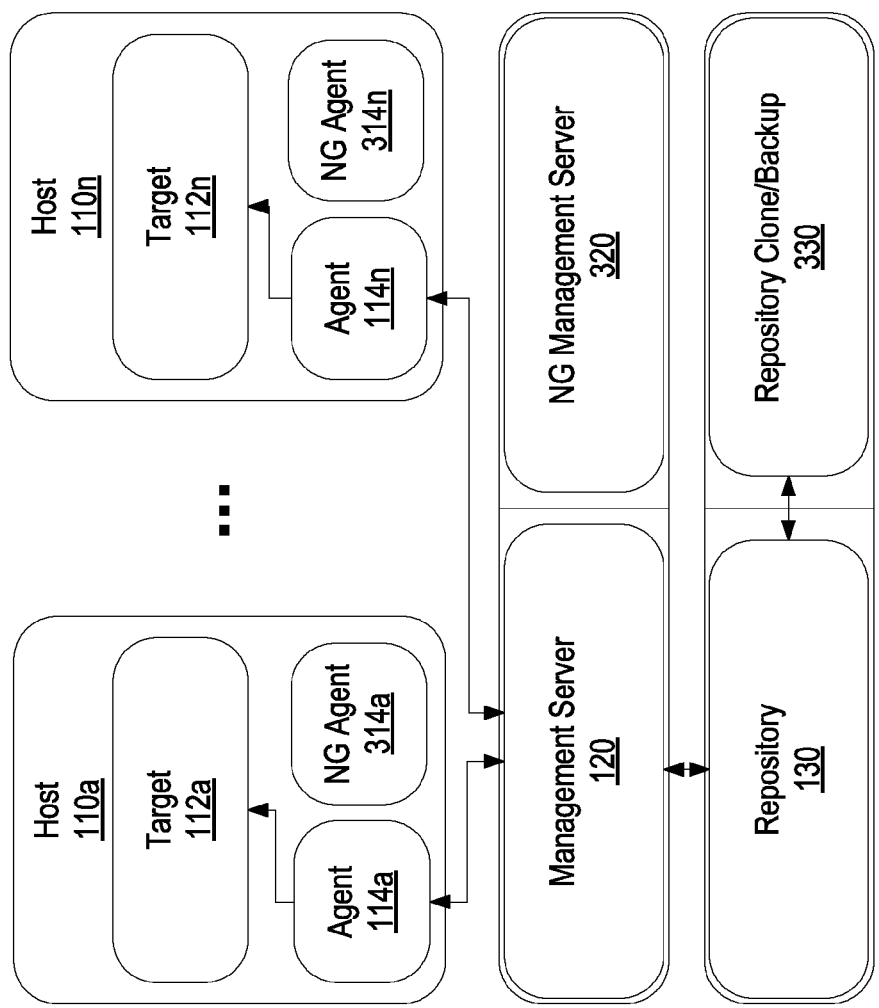
FIGS. 3A to 3D are block diagrams illustrating different states of a system during the upgrade process, according to an embodiment.

FIG. 3A is a block diagram illustrating the state of a system upgrade after the pre-deployment phase has completed. As illustrated NG agents 314a to 314n have been pre-deployed on hosts 110a to 110n, respectively. In addition, NG management server 320 has been pre-deployed. The pre-deployed components reside on their respective host, but are inactive and do not perform their normal functions of monitoring and aggregating data from the targets. During this time, the legacy system is fully operational. Legacy agents 114a to 114n monitor targets 112a to 112n, respectively and send the collected data to legacy management server 120. Legacy management server 120 stores the received data in repository 130. Thus, monitoring of the targets by the legacy management system continues without interruption.

In some cases, the legacy management system and/or agents may be customized with add-ons, plug-ins and/or other specific configurations. In such cases, the upgrade manager 140 automatically detects and pre-deploys these specialized configurations with the NG agents. Pre-deployment unit 142 copies the bits of the plugins, add-ons, and configuration files of the corresponding legacy agent and migrates them with the NG agent to the target host. Once activated, the NG agent has the same plugins, add-ons, and configurations as the corresponding legacy agent.

Activation of New Management Server

In step 206 of the upgrade process, activation unit 144 configures and starts the pre-deployed NG management server. The NG management server can be deployed in the same host or a different host as the legacy management server. Once activated, the NG management server is ready to communicate with active NG agents.

During this configuration and activation phase, upgrade manager 140 prepares a repository for use by the NG management server. In one embodiment, the repository used by the legacy management server (the "legacy repository") is backed up or otherwise copied to generate a new repository (the "NG repository"). The NG repository has all of the data aggregated by the legacy management system and is configured for use by the NG management server. The legacy management server continues to use the legacy repository while it is active, and the NG management server uses the newly generated NG repository.

In some cases, the structure and/or format of the data stored within the repository may be different in the NG management system. For example, the NG management system may use different database schemas than the legacy system. If this is the case, then the backup repository is upgraded by converting the data in the NG repository to the format supported by the NG management system.

Figure 3B:
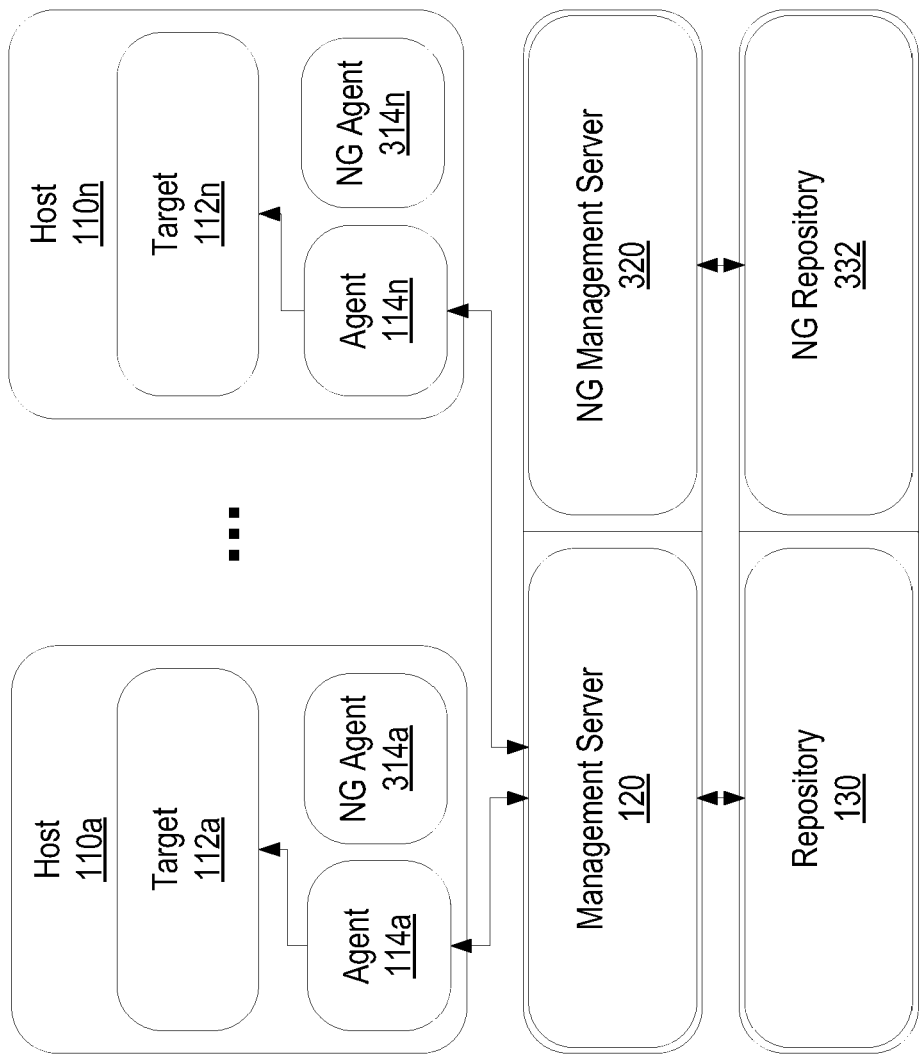

FIG. 3A shows legacy repository 130 being backed up to generate repository clone/backup 330. FIG. 3B is a block diagram illustrating the state of a system upgrade after the activation phase of a NG management server has completed. The clone/backup repository 330 is upgraded to the NG repository 332. Once activated, the NG management server 320 communicatively couples with the NG repository 332. NG management server 320 stores data received from active NG agents in NG repository 332. When NG management server 320 first becomes active, the NG agents are still in their pre-deployed state. Thus, NG Agents 314a and 314n remain inactive and do not monitor corresponding targets 112a and 112n, respectively. Furthermore, these NG agents are not yet communicatively coupled to NG management server 320 and do not send data for storage in NG repository 332.

Even after NG management server 320 is activated, legacy management server 120 remains active. Accordingly, legacy agent 114a collects data from target 112a and sends this data to management server 120. Similarly, agent 114n collects data from target 112n and sends the data to management server 120. Management server 120 continues to format and store this data in repository 130.

Incremental Activation of New Agents

Once NG management server 320 has become active, the NG agents may be activated in an incremental fashion. Accordingly, in step 208, activation unit 144 identifies a set of one or more legacy agents for switchover. In an embodiment, if the corresponding NG agent for any of the identified legacy agents has not yet been pre-deployed, then it is pre-deployed at this stage.

In step 210, activation unit 144 switches over the identified legacy agents by shutting down them down and activating the corresponding NG agents. Upon shutdown (or deactivation), the legacy agent stops monitoring the target and relinquishes the port that is used to communicate with the legacy management server. Upon activation, the corresponding NG agent begins monitoring the target and uses the relinquished port to communicate with and send data to the NG management server. In an embodiment, this step also involves data migrator 150 migrating accrued data from the legacy repository to the NG repository. Accrued data migration is described in further detail below.

In step 212, upgrade manager 140 determines whether there are any remaining legacy agents that have not been upgraded For example, the upgrade manager 140 may maintain and check an inventory to identify the total number of agents within the management system and which agents have already been migrated. If there are any remaining agents, then the process returns to step 208, and a new set of NG agents is activated. If all the NG agents have been successfully activated, then the process continues to step 214.

In step 214, the legacy management system is decommissioned. In an embodiment, this step involves uninstalling and removing the legacy components from their target hosts. Accordingly, legacy agents 114a to 114n are uninstalled and deleted from hosts 110a to 110n, and management server 120 are deleted from their respective hosts. If deferred data migration is implemented and still in process, then upgrade manager 140 may delay decommissioning of at least the legacy repository 130 until the deferred data migration is complete. Deferred data migration is described in further detail below.

Figure 3C:
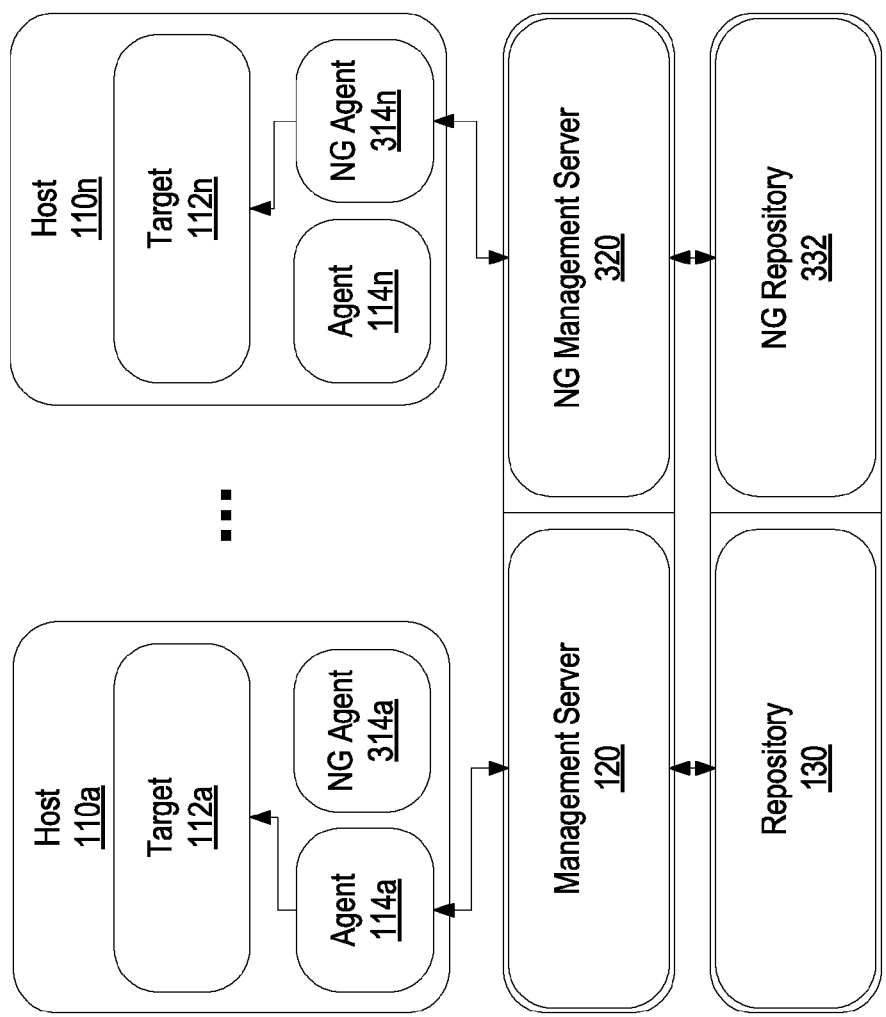

FIG. 3C is a block diagram illustrating the state of a system upgrade after a portion of the NG agents have been activated. Referring to FIG. 3C, the switchover process for legacy agent 114n is complete, and NG agent 314n has been fully activated. Accordingly, NG agent 314n monitors and collects data from target 112n. In addition, NG agent 314n sends data to NG management server 320, which formats and stores the data in NG repository 332. By contrast, the switchover process for agent 114a has not yet been performed or is not yet complete. Legacy agent 114a continues to monitor target 112a and send data to legacy management server 120.

Figure 3D:
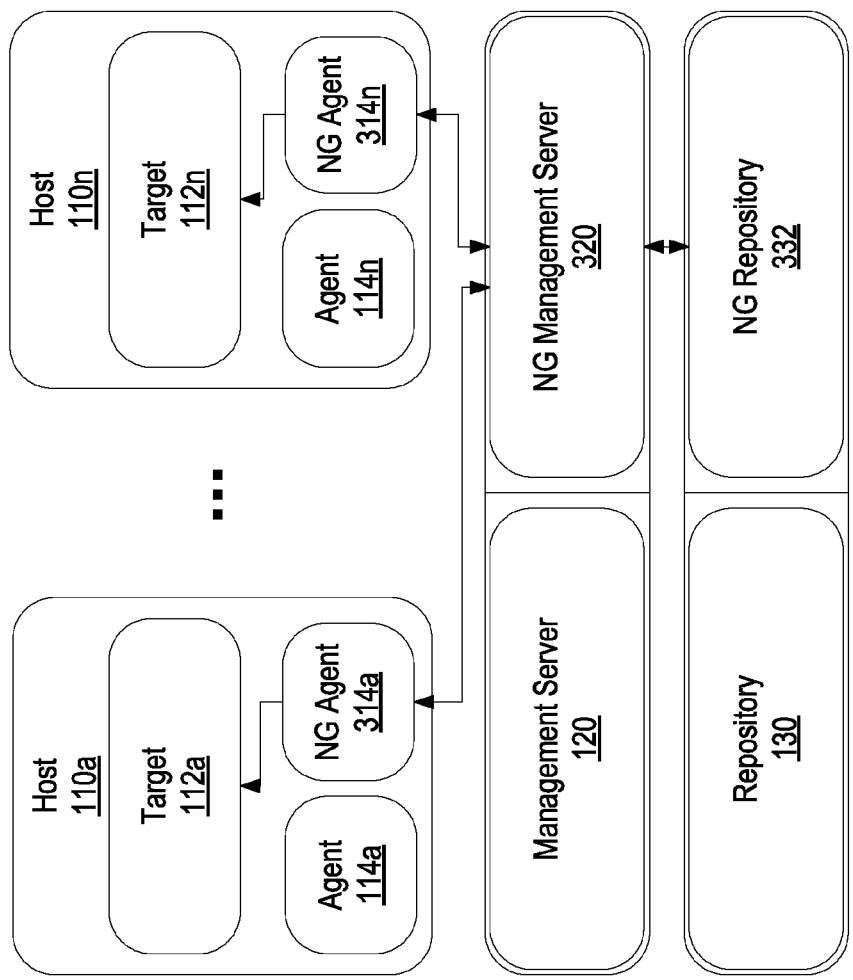

FIG. 3D is a block diagram illustrating the state of a system upgrade after all NG agents have been activated. NG agents 314a to 314n are all active and monitor respective targets 112a to 112n. All legacy agents 114a to 114n are now shutdown. Therefore, these legacy agents as well as management server 120 and repository 130 are ready to be decommissioned.

The incremental and out of place nature of the agent activation allows the upgrade process to take place over long periods of time without any monitoring loss of target data. For example, a first batch of agents may be switched over to the new system one day. A period of a week or a month may pass before all the remaining agents are also migrated to the new system.

The order of the migration may vary from implementation to implementation. In an embodiment, the agents are migrated based on an associated priority level. Certain agents may be considered more important because of the amount of data they collect, the target that they monitor, and/or other criteria. Upgrade manager 140 may migrate the agents in an order determined by the priority level. Higher priority agents are migrated before lower priority agents. In alternative embodiments, the order is manually selected by a user, randomly selected, or selected based on some other criteria.

Coexistence of Non-Compatible Management Systems

As illustrated above, the legacy and NG management systems coexist and concurrently operate during the upgrade process, even though the NG management system may not be backward compatible with the legacy system. For example, NG agent 314a to 314n and NG management server 320 may not be able to interface or otherwise communicate with the legacy system. Accordingly, NG agent 114a cannot properly interface with legacy agent 114a or management server 120. Similarly, NG management server 320 cannot properly interface with these the legacy agents or legacy repository 130. Conversely, the legacy components cannot properly interface with any of the NG components.

Despite the incompatibility between the two systems, the upgrade process may achieve zero downtime with no monitoring. The NG management system captures target data for each of the target as the NG Agents become active. However, there is no monitoring loss because the legacy system continues to capture data for those targets whose agents have not yet been upgraded. In contrast to waiting for the entire NG management system to come online before startup, the upgrade process allows incremental and out-of-place deployment of NG components while the NG management system is already operating.

Accrued Data Migration

During the upgrade process, between the time the backup of the repository is taken and the time of the agent switchover, the legacy agent would still have collected and pushed some data into the legacy repository. This data will not be in the NG repository unless it is made available to the NG management system. This data is referred to as "accrued target data."

Figure 4:
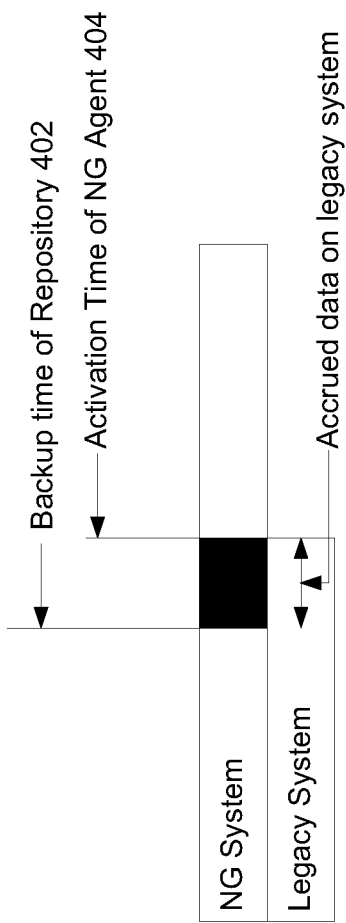
FIG. 4 is a block diagram illustrating data that accrues on a legacy system between repository backup and activation of a next generation agent, according to an embodiment.

FIG. 4 is a block diagram illustrating data that accrues on a legacy system between repository backup and activation of a next generation agent, according to an embodiment. Time 402 indicates the backup time of the repository. Time 404 indicates the activation time of the NG agent. As illustrated, NG system has a blackout period between time 402 and 404 where no data accrues in the NG repository. During this period, however, the legacy system continues to accrue data.

In an embodiment, data migrator 150 is responsible for identifying accrued data and migrating the data to the NG repository. To track the changes, data migrator 150 maintains a change log that identifies changes to the legacy repository since the backup occurred. After an agent has been successfully switched over, the change log can be used to identify the accrued data and transfer the accrued data from the legacy repository to the NG repository.

Deferred Data Migration

Backing up the entire legacy repository may take a significant amount of time depending on the amount of data that is stored. In order to hasten the upgrade process, migration of historical data may be deferred until after the NG management server is active.

In an embodiment, data migrator 150 identifies historical data in the legacy repository and defers migrating this data to the NG repository. The historical data are data older than a particular threshold. The threshold may be expressed as any unit of time, such as a particular date or passage of time. During the initial backup of the legacy repository, only data that are more recent than the threshold are copied. In such a scenario, repository backup 330 is not a complete clone of repository 130 as repository backup 330 does not include the historical data stored in repository 130. After NG Management server 320 is activated, data migrator 150 may migrate the historical data from repository 130 to NG repository 332 as a background process.

Health and Other Status Checks

In one embodiment, upgrade manager 140 includes status monitor 148 for testing and validating NG agents before they are fully activated. The health checks that are performed may vary from implementation to implementation. For example, tests may be performed to check that the NG agent is properly installed and configured on the target host, that the NG agent is able to start and begin collection, and that the NG agent is able to connect to the NG management server. If the health check identifies an NG agent that cannot be successfully deployed on a particular host, then activation unit 144 does not activate the NG agent, and the corresponding legacy agent will continue operating to prevent any monitoring loss from a switchover to an inoperable agent.

In another embodiment, status monitor 148 monitors the status of the agent switchover and generates status reports for an end user. The status reports are displayed to the end user through monitor interface 146. For example, status monitor 148 may show through monitor interface 146, the status of the upgrade process as a whole, the number and status of legacy agents, the information of agents/hosts where deployment of NG agents is already done, links to logs if deployment failed, a list of related agents, where activation of NG agents is occurring and the status of these activations, a list of agents that cannot be upgraded, reasons why an agent cannot be upgraded, and health check results for pre-deployed agents.

Fall Back to Legacy System

If the upgrade process fails or the NG system does not perform as expected, then legacy management system can be used as a quick fallback. For example, an NG agent that has been activated may not be properly performing for a variety of reasons. In this scenario, the NG agent can fall back to the legacy agent in the same manner that legacy agent switched over to the NG agent. Accordingly, activation unit 144 shuts the NG agent down and reactivates the legacy agent.

In some cases, the user may choose to abort the entire upgrade process. If this happens, then each of the NG agents that have been deployed can be deactivated and switched back over to the corresponding legacy agent. For example, if the user chooses to abort the upgrade process during the state illustrated in FIG. 3C, then activation unit 144 shuts down NG agent 314n and reactivates agent 114n. Thus, NG agent 314n stops monitoring target 112n and communicating with NG management server 320. Legacy agent 114n resumes monitoring and collecting data from target 112n. The fallback process does not need to be performed for target 112a since agent 114a has not yet been migrated to NG agent 314a.

Grouping Migration of Related Agents

In certain implementations, a plurality of agents may be related to each other. For example, a group of agents may all be configured to monitor different levels of the same system. A system administrator may want to migrate agents that are part of the same system or some other related group at the same time In an embodiment, upgrade manager 140 identifies related agents and groups these agents together for the switchover process. Once a group is identified, pre-deployment unit 152 and activation unit 154 treat members of the group as a single unit. Therefore, if one member of the group is pre-deployed, then all other members are pre-deployed. If one member of the group is activated, the other members are activated as well.

In an embodiment, upgrade manager 140 may notify and/or prevent a user from migrating an individual member of the group. For example, a user may select a particular legacy agent for migration through manager interface 146. If this legacy agent is part of a group, upgrade manager 140 generates and displays a notification indicating that the legacy agent is part of a group and cannot be individually migrated. The notification may also identify other members of the group and allow the user to option to migrate all members of the group together or defer migration until a later time. If the user chooses to migrate the group, then the switchover process is performed for each member of the group.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
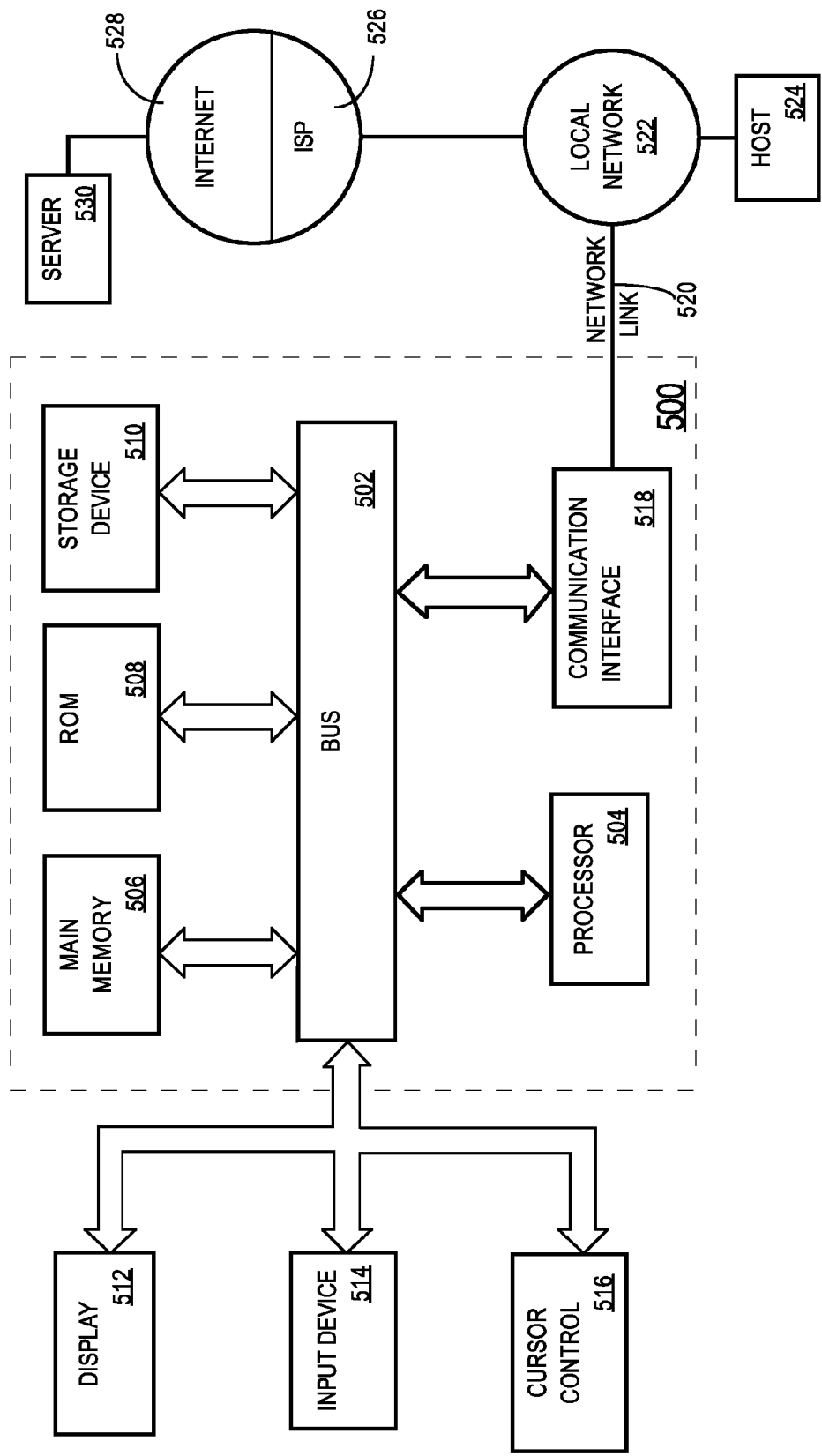
FIG. 5 is a block diagram that illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for upgrading a system that includes a first set of agents for collecting target data from a plurality of targets and sending the target data to a first management server, the method comprising:
   pre-deploying a second set of agents on a set of one or more hosts that are executing the first set of agents;
   wherein each pre-deployed agent in the second set of agents is configured to, upon activation, collect target data from a respective target of the plurality of targets and send the target data to a second management server;
   wherein each pre-deployed agent in the second set of agents remains inactive until activation;
   wherein for each pre-deployed agent in the second set of agents, a respective agent from the first set of agents collects the target data and sends the target data to the first management server while the pre-deployed agent remains inactive;
   activating a first batch of one or more agents from the second set of agents;
   wherein each activated agent in the first batch of one or more agents begins collecting data from the respective target of the plurality of targets and sending the target data to the second management server;
   wherein a second batch of one or more agents from the second set of agents remains inactive after the first batch is activated;
   wherein for each agent in the second batch of one or more agents, a respective agent from the first set of agents continues to collect the target data and send the target data to the first management server; and
   wherein the method is performed by one or more computing devices.

2. The method of claim 1, wherein the second set of agents are not compatible with the first management server; and wherein the second management server is not compatible with the first set of agents.

3. The method of claim 1, wherein the second batch of one or more agents are pre-deployed after the first batch of one or more agents have been activated.

4. The method of claim 1, further comprising:
   configuring and activating the second management server before activating the first batch of agents;
   wherein configuring and activating the second management server comprises copying data from a first repository that stores the target data sent by the first set of agents to the first management server to a second repository; and
   wherein the second management server stores the target data received by the second set of agents in the second repository.

5. The method of claim 4, further comprising:
   in response to activating the first batch of one or more agents, migrating accrued target data from the first repository to the second repository for each agent in the first batch of agents; and
   wherein the accrued target data comprises target data sent between a time at which said copying occurred and a time associated with said activating.

6. The method of claim 4, wherein said copying comprises:
   copying only data that is more recent than a specified threshold time; and
   wherein a background process copies data that is older than the specified threshold from the first repository to the second repository after activating the second management server.

7. The method of claim 1, wherein each agent in the first batch of one or more agents is tested before activation to determine whether said each agent will operate correctly upon activation.

8. The method of claim 1, further comprising:
   in response to determining that a particular agents from the first batch of agents is not operating properly, (a) deactivating the particular agent; and
   (b) reactivating the respective agent from the first set of agents.

9. The method of claim 1, further comprising:
   identifying a group of related agents in the first set of agents; and
   preventing related agents in the group from being activated in different batches.

10. The method of claim 1, further comprising decommissioning the first set of agents and the first management server after all agents in the second set of agents have been activated.

11. One or more non-transitory computer-readable media storing instructions for upgrading a system that includes a first set of agents for collecting target data from a plurality of targets and sending the target data to a first management server, the instruction, when executed, causing one or more computing devices to perform operations comprising:
   pre-deploying a second set of agents on a set of one or more hosts that are executing the first set of agents;
   wherein each pre-deployed agent in the second set of agents is configured to, upon activation, collect target data from a respective target of the plurality of targets and send the target data to a second management server;

wherein each pre-deployed agent in the second set of agents remains inactive until activation;

wherein for each pre-deployed agent in the second set of agents, a respective agent from the first set of agents collects the target data and sends the target data to the first management server while the pre-deployed agent remains inactive;

activating a first batch of one or more agents from the second set of agents;

wherein each activated agent in the first batch of one or more agents begins collecting data from the respective target of the plurality of targets and sending the target data to the second management server;

wherein a second batch of one or more agents from the second set of agents remains inactive after the first batch is activated; and wherein for each agent in the second batch of one or more agents, a respective agent from the first set of agents continues to collect the target data and send the target data to the first management server.

12. The non-transitory computer-readable media of claim 11, wherein the second set of agents are not compatible with the first management server; and wherein the second management server is not compatible with the first set of agents.

13. The non-transitory computer-readable media of claim 11, wherein the second batch of one or more agents are pre-deployed after the first batch of one or more agents have been activated.

14. The non-transitory computer-readable media of claim 11, wherein the instructions further cause the one or more computing devices to perform operations comprising:

configuring and activating the second management server before activating the first batch of agents; and wherein configuring and activating the second management server comprises copying data from a first repository that stores the target data sent by the first set of agents to the first management server to a second repository; wherein the second management server stores the target data received by the second set of agents in the second repository.

15. The non-transitory computer-readable media of claim 14, wherein the instructions further cause the one or more computing devices to perform operations comprising:

in response to activating the first batch of one or more agents, migrating accrued target data from the first repository to the second repository for each agent in the first batch of agents; and wherein the accrued target data comprises target data sent between a time at which said copying occurred and a time associated with said activating.

16. The non-transitory computer-readable media of claim 14, wherein instructions for said copying comprise instructions for:

copying only data that is more recent than a specified threshold time; and wherein a background process copies data that is older than the specified threshold from the first repository to the second repository after activating the second management server.

17. The non-transitory computer-readable media of claim 11, wherein each agent in the first batch of one or more agents is tested before activation to determine whether said each agent will operate correctly upon activation.

18. The non-transitory computer-readable media of claim 11, wherein the instructions further cause the one or more computing devices to perform operations comprising:

in response to determining that a particular agents from the first batch of agents is not operating properly, (a) deactivating the particular agent; and (b) reactivating the respective agent from the first set of agents.

19. The non-transitory computer-readable media of claim 11, wherein the instructions further cause the one or more computing devices to perform operations comprising:

identifying a group of related agents in the first set of agents; and preventing related agents in the group from being activated in different batches.

20. The non-transitory computer-readable media of claim 11, wherein the instructions further cause the one or more computing devices to perform operations comprising decommissioning the first set of agents and the first management server after all agents in the second set of agents have been activated.

* * * * *

UNITED STATES PATENT AND TRADEMARK OFFICE
CERTIFICATE OF CORRECTION

| | | |
|---|---|---|
| PATENT NO. | : 8,892,712 B2 | Page 1 of 1 |
| APPLICATION NO. | : 13/630869 | |
| DATED | : November 18, 2014 | |
| INVENTOR(S) | : Kuchibhotla et al. | |

It is certified that error appears in the above-identified patent and that said Letters Patent is hereby corrected as shown below:

On the Title Page,

On first page, in column 1, under Applicant, line 1, delete "Coporation," and insert -- Corporation, --, therefor.

On first page, column 1, under Inventors, line 4, delete "Berkley," and insert -- Berkeley, --, therefor.

On first page, column 1, under Inventors, line 5, delete "Banglore," and insert -- Bangalore, --, therefor.

In the illustrative figure, under reference numeral 214, line 1, delete "sytem" and insert -- system --, therefor.

In the Drawings,

On sheet 2 of 8, in figure 2, under Reference Numeral 214, line 1, delete "sytem" and insert -- system --, therefor.

In the Specification,

In column 6, line 13, delete "upgraded" and insert -- upgraded. --, therefor.

In column 8, line 59, delete "time" and insert -- time. --, therefor.

Signed and Sealed this
Sixteenth Day of June, 2015

Michelle K. Lee
*Director of the United States Patent and Trademark Office*